US009715096B2

(12) United States Patent
Sangu

(10) Patent No.: US 9,715,096 B2
(45) Date of Patent: Jul. 25, 2017

(54) MICROSCOPE APPARATUS

(71) Applicant: YOKOGAWA ELECTRIC CORPORATION, Musashino-shi, Tokyo (JP)

(72) Inventor: Hiroyuki Sangu, Musashino (JP)

(73) Assignee: YOKOGAWA ELECTRIC CORPORATION, Musashino-shi, Tokyo (JP)

(*) Notice: Subject to any disclaimer, the term of this patent is extended or adjusted under 35 U.S.C. 154(b) by 77 days.

(21) Appl. No.: 14/570,441

(22) Filed: Dec. 15, 2014

(65) Prior Publication Data
US 2015/0177503 A1 Jun. 25, 2015

(30) Foreign Application Priority Data

Dec. 19, 2013 (JP) ................................. 2013-262291
Oct. 8, 2014 (JP) ................................. 2014-206876

(51) Int. Cl.
*G02B 21/08* (2006.01)
*G02B 21/36* (2006.01)
*G02B 21/00* (2006.01)
*G02B 21/06* (2006.01)

(52) U.S. Cl.
CPC ....... *G02B 21/088* (2013.01); *G02B 21/0032* (2013.01); *G02B 21/0044* (2013.01); *G02B 21/0056* (2013.01); *G02B 21/0076* (2013.01); *G02B 21/06* (2013.01); *G02B 21/361* (2013.01)

(58) Field of Classification Search
CPC G02B 21/088; G02B 21/361; G02B 21/0056; G02B 21/0032; G02B 21/06; G02B 21/0044; G02B 21/0076
See application file for complete search history.

(56) References Cited

U.S. PATENT DOCUMENTS 5,241,364 A * 8/1993 Kimura .............. G02B 21/0068
356/491
5,371,624 A 12/1994 Nagano et al.
5,625,613 A * 4/1997 Kato ...................... G11B 7/005
369/112.15
(Continued)

FOREIGN PATENT DOCUMENTS

JP 05-150164 A 6/1993
JP 05-333272 A 12/1993
(Continued)

OTHER PUBLICATIONS

Chen, J. et al. "Super-resolution differential interference contrast microscopy by structured illumination", Optics Express, vol. 21, No. 1, (Jan. 2, 2013), pp. 112-121.*

Primary Examiner — Thomas K Pham
Assistant Examiner — Cara Rakowski
(74) Attorney, Agent, or Firm — Sughrue Mion, PLLC

(57) ABSTRACT

A microscope apparatus includes a light source configured to emit a coherent illuminating light, an optical system configured to irradiate a specimen with the illumination light, and a detector configured to form an image based on a light generated from the specimen by the illumination light that irradiates the specimen. The optical system is configured to project a plurality of focal points of the illumination light on the specimen, and allow the plurality of focal points to interfere with each other while changing phases of the plurality of focal points.

11 Claims, 15 Drawing Sheets

(56) References Cited

U.S. PATENT DOCUMENTS

| | | | |
|---|---|---|---|
| 6,020,988 A * | 2/2000 | Deliwala | G02B 27/58 246/264 |
| 6,628,390 B1 * | 9/2003 | Johnson | G01B 11/26 356/400 |
| 2006/0209399 A1 | 9/2006 | Mikuriya et al. | |
| 2008/0258077 A1 * | 10/2008 | Baer | G02B 21/0056 250/458.1 |
| 2009/0185034 A1 | 7/2009 | Kishida et al. | |
| 2011/0235045 A1 | 9/2011 | Koerner et al. | |
| 2013/0015366 A1 | 1/2013 | Hayashi | |
| 2013/0128346 A1 | 5/2013 | Sanguu | |

FOREIGN PATENT DOCUMENTS

| | | |
|---|---|---|
| JP | 2003-255231 A | 9/2003 |
| JP | 2009-169236 A | 7/2009 |
| JP | 2013-20083 A | 1/2013 |

\* cited by examiner

MICROSCOPE APPARATUS

CROSS-REFERENCE TO RELATED APPLICATION

This application claims priority from Japanese Patent Application Nos. 2013-262291 filed on Dec. 19, 2013 and 2014-206876 filed on Oct. 8, 2014 with the Japan Patent Office, the entire contents of which are hereby incorporated by reference.

BACKGROUND

1. Technical Field

The present disclosure relates to a microscope apparatus.

2. Related Art

In general, there are two types of microscopes used in the field of biological research. One is a fluorescence microscope for fluorescently staining a specimen. The other is a microscope for observing a transmitted light, a diffracted light, and/or a reflected light from a specimen without fluorescently staining the specimen. As these microscopes, a bright field microscope, a phase contrast microscope, a differential interference microscope, and the like are known.

FIG. 19 is an explanatory diagram illustrating a configuration of a typical phase contrast microscope disclosed in JP-A-5-333272. As illustrated in FIG. 19, the phase contrast microscope includes a light source 1, a condenser lens 2a and an imaging lens 2b constituting an optical system 2, an aperture diaphragm plate 3, and a phase plate 4. A transparent observation object 5 is supported on a specimen table 6, and arranged between the condenser lens 2a and the imaging lens 2b. In this drawing, an imaging plane 7 is arranged above the phase plate 4.

The aperture diaphragm plate 3 is configured to be able to change an illumination light from the light source 1 to a squeezed light having a predetermined pattern such as a ring slit shape.

The phase plate 4 includes a transparent plate 4a and a phase control film 4b. The phase control film 4b is formed on the transparent plate 4a to have the same shape as an opening of the aperture diaphragm plate 3. The phase control film 4b causes a delay (or advance) in phase of light transmitting therethrough, and reduces the amount of transmitted light. The aperture diaphragm plate 3 is disposed at the front focal position of the optical system 2, while the phase plate 4 is disposed at the rear focal position.

Light emitted from the light source 1 is first passed through a light transmitting portion of the aperture diaphragm plate 3, and formed into a ring-shaped light. The light is collimated to a parallel light by the condenser lens 2a, and then transmitted through the observation object 5. The transmitted light is passed sequentially through the imaging lens 2b and the phase plate 4, and focused on the imaging plane 7.

When the observation object 5 is homogeneous with no irregularities on its surface, the illumination light narrowed down to the ring shape by the aperture diaphragm plate 3 is transmitted through the observation object 5, passed through the phase control film 4b of the phase plate 4, and projected directly on the imaging plane 7 as a direct light (S wave).

On the other hand, when another object 5a is stacked on the observation object 5, for example, it may cause a difference in refractive index or irregularities on the surface of the observation object 5. In such a case, the light is diffracted when passed through the area of the observation object 5 where the object 5a is located. The diffracted light (D wave) is transmitted through the area of the phase plate 4 excluding the phase control film 4b. Further, the D wave shifts in phase with respect to the S wave.

The phase shift changes depending on the thickness of the object 5a, and the difference in refractive index between the area of the object 5 where the object 5a is present and the other area. When the refractive index difference is small and the object 5a is thin, the phase shift is approximately $\lambda/4$. Here, the aperture diaphragm plate 3 is disposed at the front focal position, and the phase control film 4b of the phase plate 4 is disposed at the rear focal position. Thus, the S wave always passes through the phase control film 4b.

Therefore, by shifting the phase (wavelength) of the light passing through the phase control film 4b in the delay or advance direction by $\lambda/4$ with respect to the D wave, and setting the amount of the transmitted light to almost the same as the amount of the diffracted light, the direct light and the diffracted light interfere with each other and therefore a difference in brightness in an image formed on the imaging plane 7 is generated. When the phase is shifted by the phase plate 4 in the advance direction, a positive contrast is displayed on the imaging plane 7. When the phase is shifted in the delay direction, a negative contrast is displayed.

FIG. 20 is an explanatory diagram illustrating a configuration of a typical fluorescence microscope disclosed in JP-A-5-150164. As illustrated in FIG. 20, light emitted from a light source 11 (e.g., a mercury lamp) is condensed by a collector lens 12.

An interference filter 13 functions as a transmission wavelength shifting filter. The interference filter 13 is rotatably held about an axis vertical to an output side optical axis of the collector lens 12. On the output side of the interference filter 13, an aperture diaphragm 14, a field diaphragm 15, an excitation filter 16 having a predetermined transmissivity, and a dichroic mirror 17 having a predetermined transmissivity are arranged in this order.

The reflected light from the dichroic mirror 17 is emitted to a specimen 20 placed on a vertically movable stage 19 via an objective lens 18. Two kinds of fluorescent lights emitted from the specimen 20 are guided to the dichroic mirror 17 through the objective lens 18 again.

An absorption filter 21 having a predetermined transmissivity and a beam splitter 22 are disposed on the exit side of the dichroic mirror 17. The beam splitter 22 is removably disposed in an optical path to switch the optical path to the observation system or photography system as appropriate.

An eyepiece optical system 23 is disposed on the observation system optical path side of the beam splitter 22. An eyepiece lens for photography 24 is arranged on the photography system optical path side.

SUMMARY

A microscope apparatus includes a light source configured to emit a coherent illuminating light, an optical system configured to irradiate a specimen with the illumination light, and a detector configured to form an image based on a light generated from the specimen by the illumination light that irradiates the specimen. The optical system is configured to project a plurality of focal points of the illumination light on the specimen, and allow the plurality of focal points to interfere with each other while changing phases of the plurality of focal points.

DETAILED DESCRIPTION OF THE EMBODIMENTS

Figure 1:
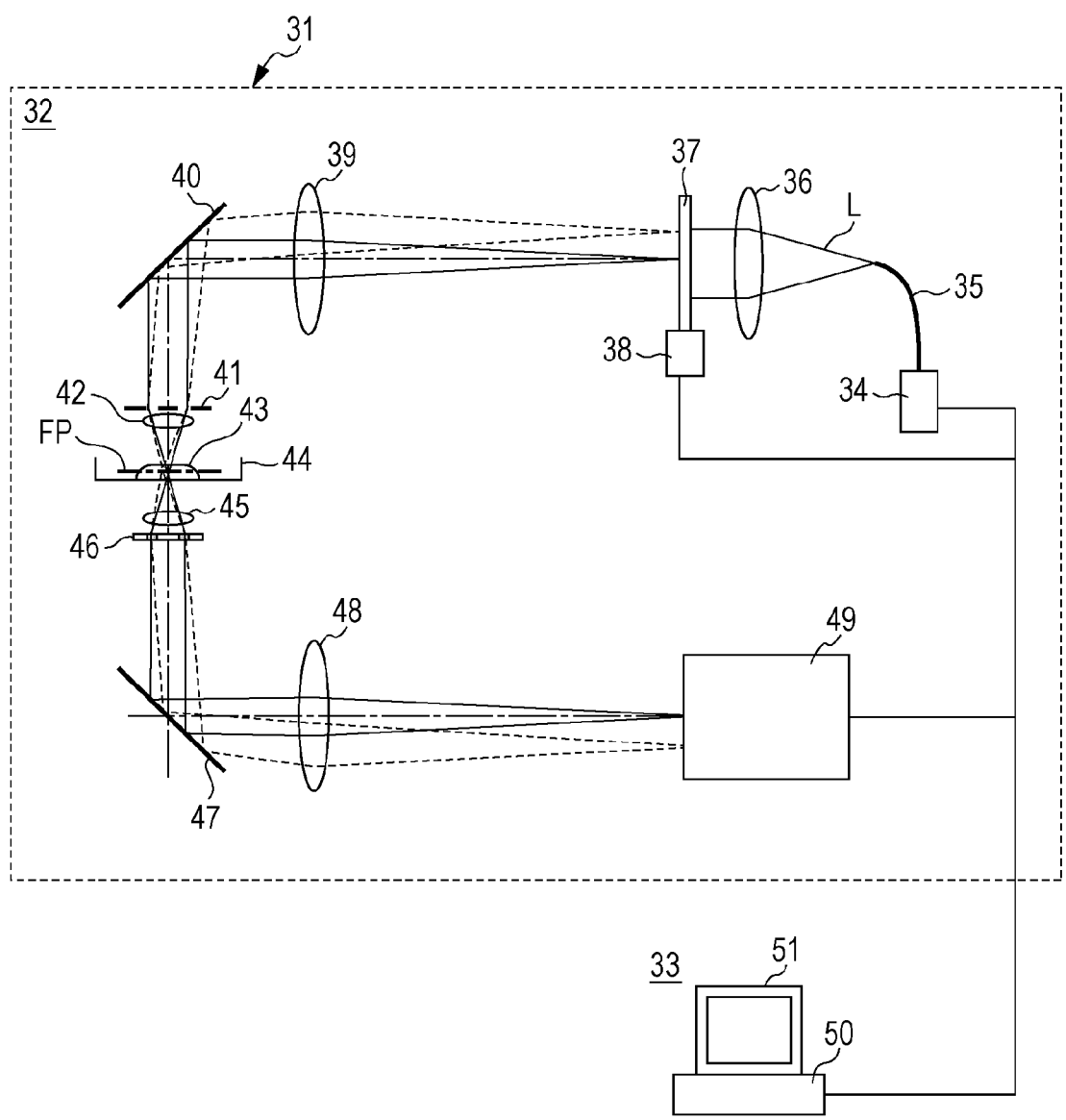
FIG. 1 is an explanatory diagram illustrating an exemplary configuration of a microscope apparatus according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

For observing finer objects such as an internal structure of a cell, it is necessary to increase a resolution. The resolution can be measured as discrimination between two different points, i.e., resolving power. The resolution is proportional to a wavelength of light used for observation, and is inversely proportional to a numerical aperture of an objective lens.

Therefore, the resolution can be increased by observing a light having a short wavelength with an objective lens having a large numerical aperture. However, an observable wavelength of light is 200 nm maximum. Accordingly, observation by use of light is limited.

Thus, in an electron microscope, an electron beam having a wavelength far shorter than that of light is used, instead of light. The resolution of the naked eye of a human is approximately 0.1 mm, and the resolution of an optical microscope is approximately 0.2 μm. In contrast, the resolution of an electron microscope is approximately 0.2 nm.

By using an electron microscope having a resolution of thousand times an optical microscope, a detailed internal structure of a cell can be observed. However, as the electron microscope uses an electron beam, it is impossible to observe a cell alive.

It is an object of the present disclosure is to provide an optical microscope, such as a phase contrast microscope or a fluorescence microscope, capable of observing in super-resolution.

A microscope apparatus according to a first aspect of the present disclosure includes a light source configured to emit a coherent illuminating light, an optical system configured to irradiate a specimen with the illumination light, and a detector configured to form an image based on a light generated from the specimen by the illumination light that irradiates the specimen. The optical system is configured to project a plurality of focal points of the illumination light on the specimen, and allow the plurality of focal points to interfere with each other while changing phases of the plurality of focal points.

In the microscope apparatus according to a second aspect of the present disclosure, the optical system is configured to form an area of the illumination light in the specimen, the area being smaller than the focal point, by changing the phases of adjacent focal points of the plurality of focal points and allowing the adjacent focal points to interfere with each other, according to the first aspect.

In the microscope apparatus according to a third aspect of the present disclosure, the optical system includes a pinhole array that includes a plurality of pinholes and generates the plurality of illumination lights by passing the illumination light from the light source through the pinhole array, according to the first aspect.

In the microscope apparatus according to a fourth aspect of the present disclosure, the pinhole array includes a half-wave plate that is disposed in every other pinhole, according to the third aspect.

The microscope apparatus according to a fifth aspect of the present disclosure further includes a fine movement stage for finely moving the pinhole array, according to the fourth aspect.

In the microscope apparatus according to a sixth aspect of the present disclosure, the optical system further includes a condenser lens that transmits the plurality of illumination lights and projects the plurality of focal points on the specimen, according to any one of the third to fifth aspects.

The microscope apparatus according to a seventh aspect of the present disclosure further includes a slit ring that is disposed on an outer periphery of a pupil diameter of the condenser lens, according to the sixth aspect.

In the microscope apparatus according to an eighth aspect of the present disclosure, the optical system further includes a phase plate for shifting a phase of a transmitted light that has passed through the specimen and a phase of a diffracted light that has been diffracted by the specimen to be deviated from each other by a half wavelength, according to any one of the first to seventh aspects.

In the microscope apparatus according to a ninth aspect of the present disclosure, an interval between the plurality of focal points is 0.6 to 2 times a distance from a center of the focal point to a first dark point (i.e., the radius of the Airy disk), according to any one of the first to eighth aspects.

The microscope apparatus according to a tenth aspect of the present disclosure further includes a high-frequency component extractor configured to extract a high-frequency component of the image formed by the detector, according to any one of the first to fifth aspects.

In the microscope apparatus according to an eleventh aspect of the present disclosure, the optical system generates a first illumination light and a second illumination light having a phase different from that of the first illumination light based on the illumination light from the light source, and projects an interference fringe on the specimen with a focal point of the first illumination light and a focal point of the second illumination light, according to the first aspect.

In the microscope apparatus according to a twelfth aspect of the present disclosure, the optical system includes a phase diffraction grating for generating the first illumination light and the second illumination light, according to the eleventh aspect.

The microscope apparatus according to a thirteenth aspect of the present disclosure further includes a phase plate for shifting a phase of a transmitted light that has passed through the specimen and a phase of a diffracted light that has been diffracted by the specimen to be deviated from each other by a half wavelength, according to the eleventh or twelfth aspect.

According to the microscope according to the first to thirteenth aspects, an illumination light (a spot of an illumination light) smaller than the diffraction limit can be obtained by interference of the plurality of focal points. Thus, it is possible to observe in super-resolution exceeding the diffraction limit of light.

Hereinafter, embodiments of the present disclosure will be described with reference to the accompanying drawings. FIG. 1 is an explanatory diagram illustrating an exemplary configuration of a microscope apparatus 31 according to an embodiment of the disclosure. The microscope apparatus 31 includes a microscope optical system 32 and a control system 33.

The microscope optical system (optical system, projection optical system) 32 includes a laser light source 34, an optical fiber 35, a collimator lens 36, a pinhole disk 37, a fine movement stage 38, a projection lens 39, a reflective mirror 40, a slit ring 41, a condenser lens 42, an objective lens 45, a phase plate 46, a total reflective mirror 47, and a tube lens 48. The pinhole disk 37 is connected to the fine movement stage 38. As the laser light source 34, a laser light source that outputs (oscillates) a light having a wavelength of 405 nm is used, for example.

The projection lens 39 is disposed in front of the pinhole disk (pinhole array) 37. The reflective mirror 40 is disposed in front of the projection lens 39. The condenser lens 42 is disposed ahead of the reflective mirror 40. The slit ring 41 is disposed at the pupil position of the condenser lens 42. A specimen 43 as an observation object is placed on a specimen table 44.

The objective lens 45 is provided for observing the light passing through the specimen 43. As the objective lens 45 and the condenser lens 42, lenses with a magnification of 100 and an NA (numerical aperture) of 1.2 are selected, for example. These lenses are disposed at positions to be conjugate with each other.

The phase plate 46 is disposed at the pupil position of the objective lens 45. The total reflective mirror 47 is disposed ahead of the phase plate 46. The tube lens 48 for imaging a light on a camera (detector) 49 is disposed ahead of the total reflective mirror. The camera 49 is disposed at the imaging position of the tube lens 48. The tube lens 48 and projection lens 39 are selected to have an equal focal distance. As the camera 49, one with a pixel size of 6 μm is used, for example.

Figure 2:
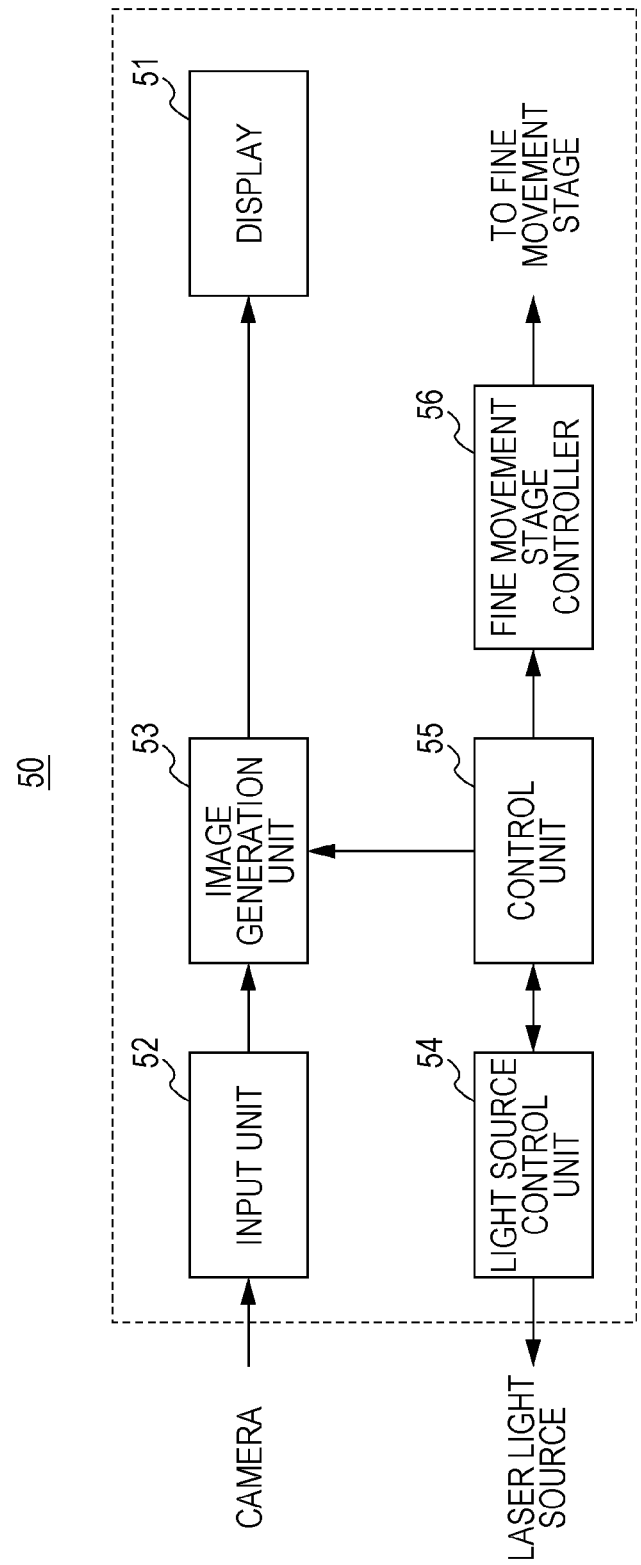
FIG. 2 is a block diagram illustrating an example of a control system.

FIG. 2 is a block diagram illustrating an example of the control system 33. As illustrated in FIG. 1, the control system 33 includes a controller 50 and a display 51. As illustrated in FIG. 2, the controller 50 includes an input unit 52, an image generation unit 53, a light source control unit 54, a control unit 55, and a fine movement stage controller 56. The image generation unit 53 is connected to the display 51.

Figure 3:
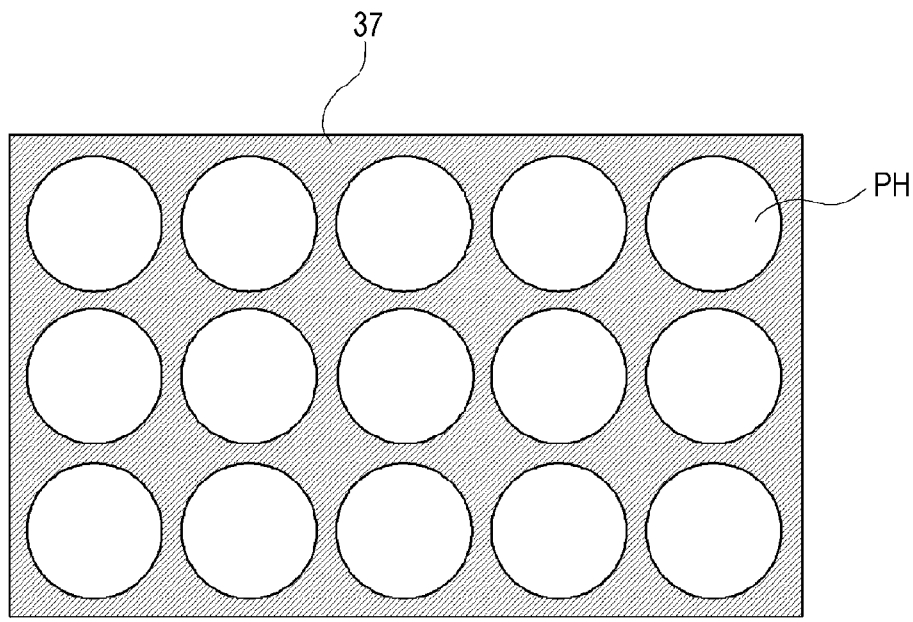
FIG. 3 is a partially enlarged diagram of a pinhole disk.

FIG. 3 is a partially enlarged view of the pinhole disk 37. A pinhole PH with a diameter of approximately 16 μm is substantially uniformly arranged in a matrix at intervals of 20 μm vertically and horizontally.

Figure 4:
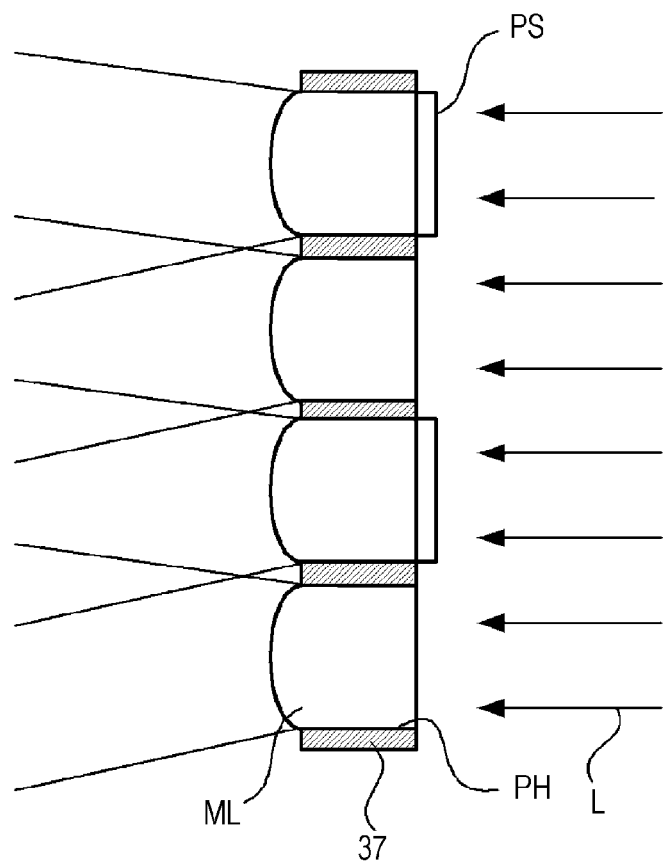
FIG. 4 is a cross-sectional view of the pinhole disk.

FIG. 4 is a cross-sectional view of the pinhole disk 37. On the exit side of the pinhole disk 37, a microlens ML is provided for each of all pinholes PH. On the incident side of the pinhole disk 37, a half-wave plate PS is provided for every other pinhole PH.

Next, the operation of the microscope apparatus 31 will be described. The output light of the laser light source 34 is incident on the collimator lens 36 through the optical fiber 35, and converted into a parallel light. The parallel light is incident on the pinhole disk 37. The parallel light is divided and diffused by the plurality of pinholes PH. A divergence angle (diffusion angle) of the light is properly adjusted by the action of the microlens ML.

The diverging light from the pinhole disk 37 is converted by the projection lens 39 into a parallel light having an inclination corresponding to the position of the pinhole PH. The parallel light is reflected by the reflective mirror 40, and then is incident (projected) on the condenser lens 42.

The slit ring 41 is disposed at the pupil position of the condenser lens 42. The outer diameter of the slit ring 41 is set to almost the same size as the pupil diameter of the condenser lens 42. Therefore, the light that has passed through the slit ring 41 is focused on the focal plane FP of the specimen 43 by the condenser lens 42 (in other words, the focal point is projected on the focal plane FP). Since the light has passed through the outer peripheral portion of the pupil diameter of the condenser lens 42, it is narrowed down to the focal point having a spot diameter close to the diffraction limit.

Each of the lights that has passed through the slit ring 41 is focused by the condenser lens 42 on the focal plane FP arranged inside the specimen 43. At the focal point, the light is divided into a light to be diffracted by a small observation target and a light to pass therethrough directly.

The transmitted light that passes through directly is converted again into a parallel light by the objective lens 45. The phase plate 46 is disposed at the pupil position of the objective lens 45. At the position of the phase plate 46 corresponding to the slit rings 41, a wave plate that advances a phase (wavelength) by a quarter wavelength is incorporated. A ND filter for adjusting brightness is further incorporated in the wave plate.

The phase (wavelength) of the light that has passed through the specimen 43 is advanced by a quarter wavelength by the wave plate. Then, the light that has passed through the wave plate is reflected by the reflective mirror 47, forms an image on the camera 49 by the imaging lens 48, and is captured by the camera 49.

On the other hand, the phase of the light diffracted by the observation target is delayed a quarter wave length owing to the diffraction. The diffracted light passes through the portion of the phase plate 46 excluding the wave plate, and then forms an image on the camera 49 through the tube lens (imaging lens) 48 at the same focal position (the same portion) as that of the transmitted light. In other words, the phase plate 46 acts to shift the phase of the transmitted light that has passed though the specimen 43 and the phase of the diffracted light that has been diffracted by the specimen 43 to be deviated from each other by a half wavelength.

The phase of the diffracted light that has been diffracted by the specimen 43 is delayed by a half wavelength behind the phase of the transmitted light that has passed through the specimen 43. Accordingly, these lights weaken each other by interference. This results in a contrast on an image captured by the camera 49.

The action (operation) of the pinhole disk 37 will be described. The lights passing through the pinhole disk 37 are coherent laser lights. The phases of the adjacent lights are deviated from each other by a half wave length by the half-wave plate PS. These lights are focused by the condenser lens 42.

If the magnification of the condenser lens 42 is 100 times as described above, the interval 20 μm between the pinholes PH is projected as 0.2 μm on the specimen 43 (i.e., the focal plane FP). Here, attention is paid to the radius of the Airy disk of the projected focal point. The radius of the Airy disk is represented by 0.61λ/NA. Accordingly, the radius of the Airy disk is approximately 0.2 μm. Therefore, the interval between the focal points and a distance from the center of the focal point to a first dark point (i.e., the radius of the Airy disk) are approximately equal.

Figure 5:
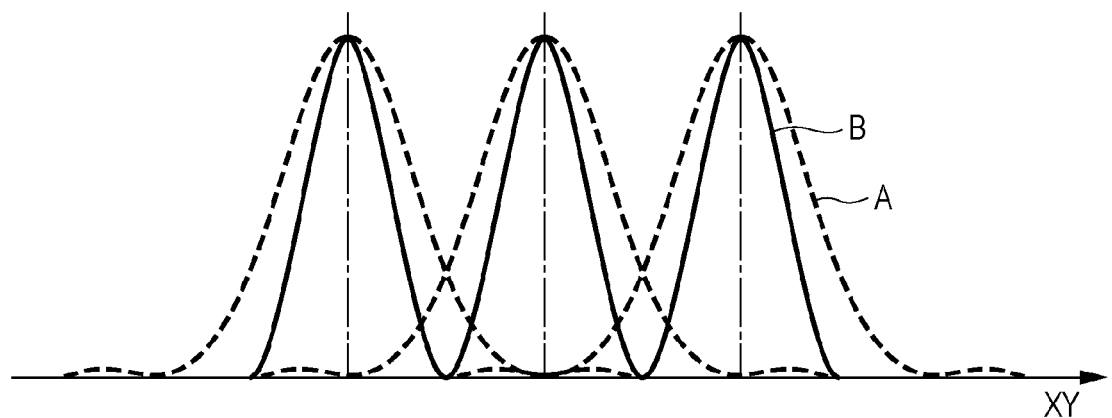
FIG. 5 is a diagram illustrating a phase distribution and an intensity distribution in a second control of the embodiment.

FIG. 5 illustrates a point spread of each light. In general, each focal point is focused as indicated by the dotted line A. Since the phases of the focal points adjacent to each other are shifted from each other by a half wavelength, the adjacent lights interfere destructively at the superposed portions. This results in the point spread as indicated by the solid line B in FIG. 5. The width of this point spread is thinner than the normal diffraction limit.

Figure 6:
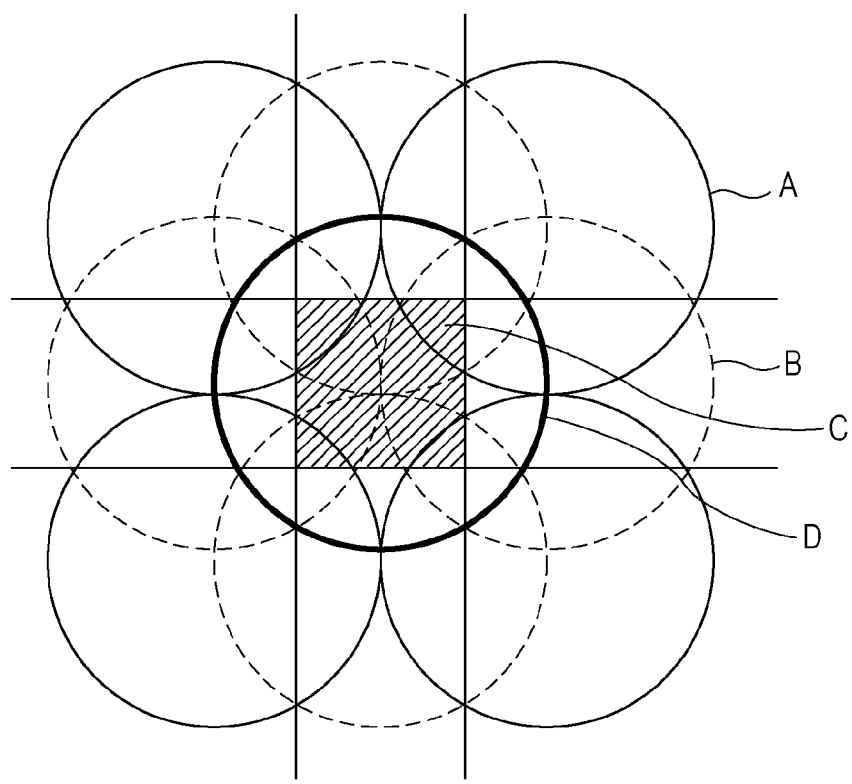
FIG. 6 is a diagram illustrating a state viewed from the front of a focal plane FP.

FIG. 6 is a diagram illustrating a state viewed from the front of the focal plane FP. Of the adjacent lights, the lights with the same phase are indicated by the solid line A, and the lights with the phases mutually shifted by a half wavelength are indicated by the dotted line B. By interference of these lights, a trough is formed by the destructive interference as indicated by the straight line in FIG. 6. Accordingly, only the area C indicated by hatching in FIG. 6 is selectively illuminated. This area is smaller than the area of the focal spot indicated by the thick solid line circle D, which is squeezed by a normal illumination light.

Figure 7:
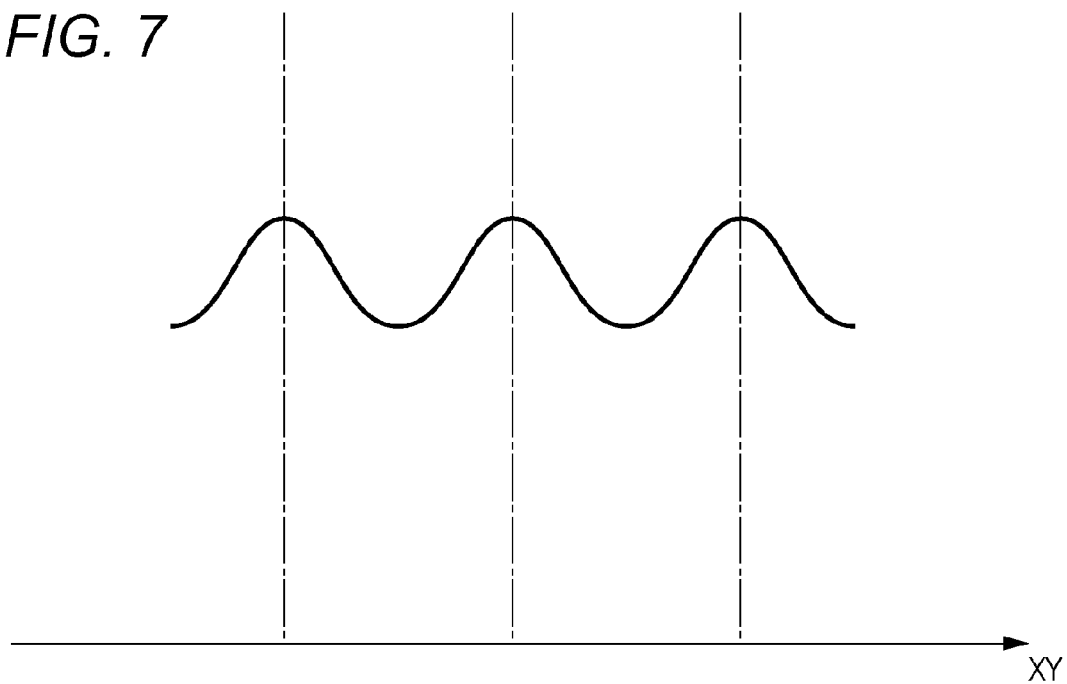
FIG. 7 is a diagram for describing a distribution example of diffracted light.

The diffracted light from this limited area interferes with the transmitted light on the camera 49. FIG. 7 illustrates an example of the distribution of the diffracted light on the camera 49. FIG. 7 illustrates the distribution of the diffracted light on the camera 49 when an extremely small observation target is placed on the top of the focal point of each illumination light and the light is diffracted.

As illustrated in FIG. 7, the distribution of the diffracted light is made gentler than a steep illumination pattern by the optical system of the imaging system. Nevertheless, the information from the limited area gets imaged on the camera 49.

The tube lens 48 and the projection lens 39 are selected to have the same focal distance. Accordingly, the interval between the focal points on the camera 49 is the same 20 μm as the pinhole interval. The pixel size of the camera 49 is, for example, 6 μm, which is sufficiently smaller than 20 μm. Thus, the camera 49 can capture the fine information.

The control unit 55 of the controller 50 controls the oscillation of the laser light source 34 via the light control unit 24. The input unit 52 stores an image to be captured here. The image to be captured here is limited image information from the narrow spot as illustrated in FIG. 5. Thus, information of the trough portion in FIG. 6 is missing.

Figure 8:
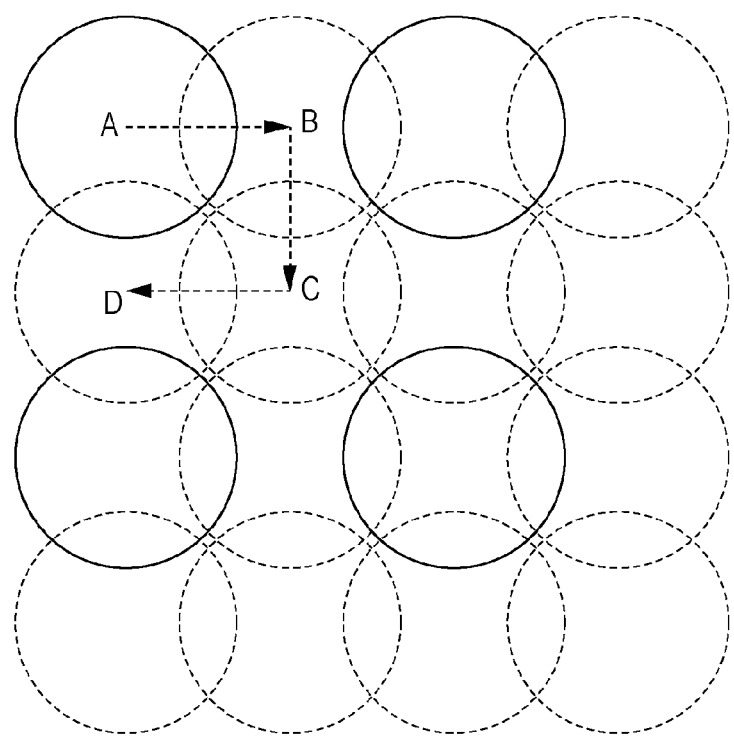
FIG. 8 is a schematic diagram illustrating an information missing state.

FIG. 8 is a schematic diagram illustrating such an information missing state. In FIG. 8, the adjacent focal points are indicated by small solid line circles. The control unit 55 performs the following processing so as to complement the part where the information is lost by the interference. In other words, the control unit 55 captures images while moving the pinhole disk 37 by a small distance as A→B→C→D via the fine movement stage controller 56 and fine movement stage 38, and stores the captured images in the input unit 52. Based on the images, the control unit 55 constructs an image by combining the information (images) using the image generation unit 53, and displays the image on the display 51.

As described above, in the microscope apparatus 31, it is possible to obtain an illumination light (a spot of illumination light) smaller than the diffraction limit by obtaining the plurality of focal points of the illumination lights and allowing the focal points to interfere with each other. Thus, a phase difference can be observed at a resolution higher than before.

Further, in the microscope apparatus 31, the slit ring 41 is provided on the outer peripheral portion of the pupil diameter of the condenser lens 42. Thus, the focal point of the condenser lens 42 close to the diffraction limit can be projected on the focal plane FP, and therefore a high resolution can be obtained.

Further, in the microscope apparatus 31, the microlens ML is provided on the entire surface of the pinhole PH. Thus, the divergence angle of the light diffracted by the pinhole PH can be adjusted, and therefore the utilization efficiency of light can be increased.

Further, in the microscope apparatus 31, the area (position) of the focal point on the focal plane FP and the camera 49 is slightly moved with the movement of the pinhole disk 37 by a small distance. Thus, the specimen 43 can be thoroughly observed.

Further, the interval between the focal points is set substantially equal to the distance from the focal point to the first dark point (i.e., the radius of the Airy disk). Thus, the area to be illuminated can be effectively reduced. This example is optimum.

Such an effect of reducing the point spread by the interference continues until the interval between the adjacent focal points becomes twice the distance from the center of the focal point to the first dark point. As the interval between the focal points increases, the effect of reducing the point spread decreases.

On the contrary, when the interval between the adjacent focal points becomes shorter than the distance from the center of the focal point to the first dark point, the intensity of a signal light decreases owing to the influence of the light on the outer side of the adjacent lights. However, it is apparent by calculation that the effect of reducing the point spread by the interference continues until the interval between the adjacent focal points becomes 0.6 times the distance from the center of the focal point to the first dark point.

Therefore, the interval between the focal points is preferably larger than 0.6 times and smaller than twice the distance from the center of the focal point to the first dark point.

Figure 9:
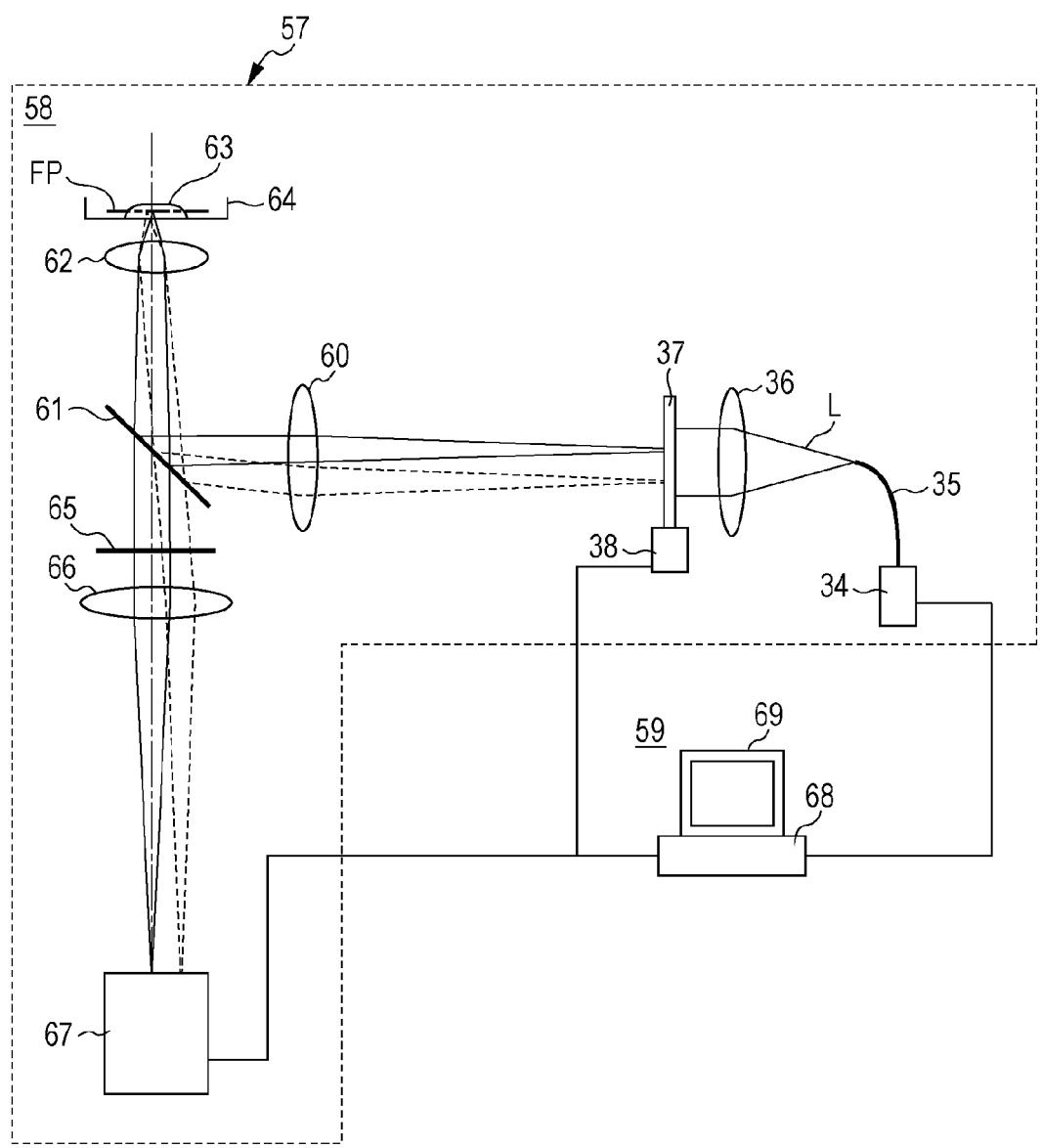
FIG. 9 is an explanatory diagram illustrating a configuration of another embodiment of the disclosure.

FIG. 9 is an explanatory diagram illustrating a configuration of another embodiment of the disclosure. A microscope apparatus 57 according to this embodiment is a fluorescence microscope. In FIG. 9, parts corresponding to those of the microscope apparatus 31 illustrated in FIG. 1 are denoted by the same reference numerals. The microscope apparatus 57 includes a microscope optical system 58 and a control system 59.

Similarly to the microscope apparatus 31 illustrated in FIG. 1, the microscope apparatus (optical system, projection optical system) 57 includes a laser light source 34, an optical fiber 35, a collimator lens 36, and a pinhole disk 37, a fine movement stage 38, a projection lens 60, a dichroic mirror 61, an objective lens 62, a fluorescence filter 65, and a tube lens 66. The pinhole disk 37 is connected to the fine movement stage 38. As the laser light source 34, a laser light source that outputs (oscillates) light having a wavelength of 405 nm is used.

The projection lens 60 is disposed in front of the pinhole disk 37. The dichroic mirror 61 is disposed in front of the projection lens 60. The dichroic mirror 61 reflects the wavelength of the laser light source 34, and transmits a light having a wavelength longer than that of the laser light source 34. An objective lens 62 is disposed ahead of the laser light reflected by the dichroic mirror 61. A specimen 63 as an observation object is placed on a specimen table 64.

As the objective lens 62, for example, a lens with a magnification of 100 and an NA of 1.2 is selected. The tube lens 66 for imaging the light on a camera 67 is disposed ahead of the light that has passed through the dichroic mirror 61. The fluorescence filter 65 is disposed between the dichroic mirror 61 and tube lens 66. The fluorescence filter 65 passes only fluorescence of a desired fluorescence band. The camera 67 is disposed at an imaging position of the tube lens 66. As the camera 67, one with a pixel size of 6 μm is used.

Figure 10:
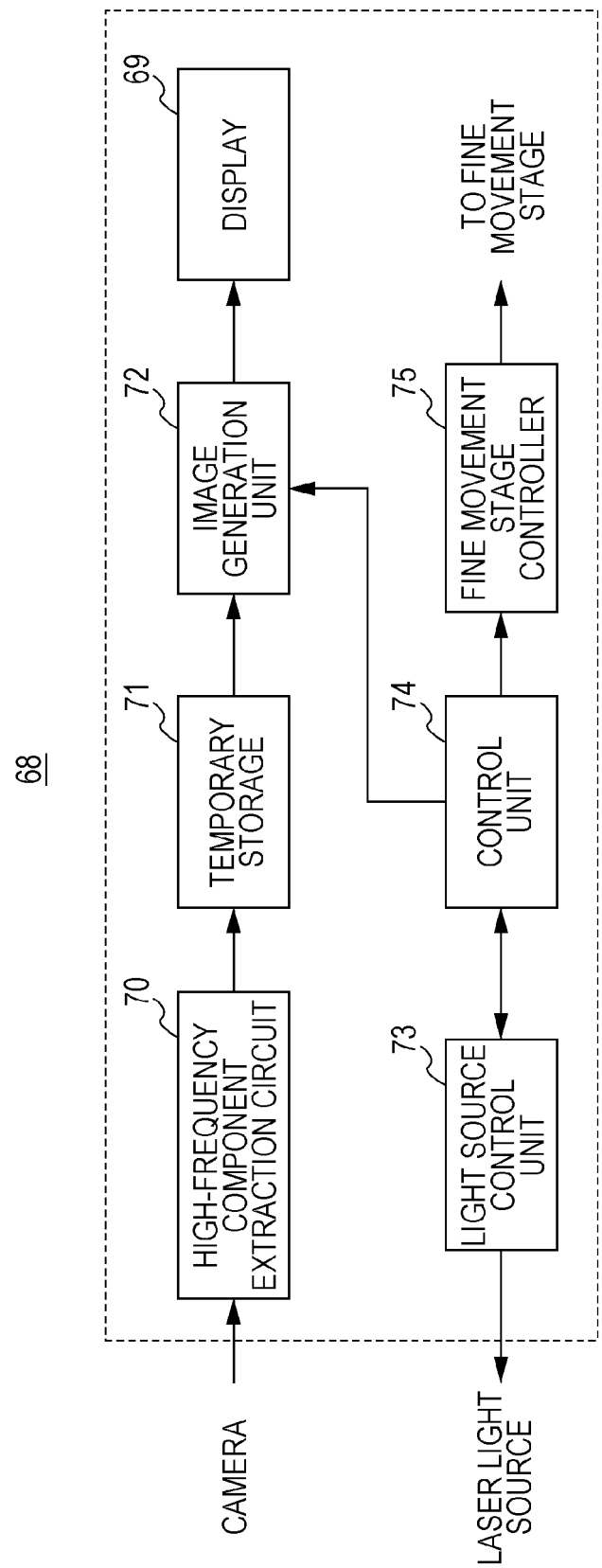
FIG. 10 is a block diagram illustrating an example of a control system.

FIG. 10 is a block diagram illustrating an example of the control system 59. The control system 59 includes a controller 68 and a display 69. The controller 68 includes a high-frequency component extraction circuit (high-frequency component extractor) 70, a temporary storage unit 71, an image generation unit 72, a light source control unit 73, a control unit 74, and a fine movement stage controller 75. The display 69 is connected to the image generation unit 72.

The operation of the microscope apparatus 57 illustrated in FIG. 9 will be described. The output light from the laser light source 34 is incident on the collimator lens 36 through the optical fiber 35, and converted into a parallel light. The parallel light is incident on the pinhole disk 37. The parallel light is divided and diffused by the pinhole PH. A divergence angle (diffusion angle) of the light is properly adjusted by the action of the microlens ML.

Each diverging light from the pinhole disk 37 is converted by the projection lens 60 into a parallel light having an inclination corresponding to the position of the pinhole PH. The parallel light is reflected by the dichroic mirror 61, and then is incident (projected) on the objective lens 62.

Each light is focused on the focal plane FP by the objective lens 62 (in other words, the focal point is projected on the focal plane FP). The light is narrowed down to a spot close to the diffraction limit by the objective lens 62. The spot is focused on the focal plane FP arranged inside the specimen 63.

At the focal position, the specimen 63 is excited by a laser light to generate fluorescence. The fluorescence is converted again into a parallel light by the objective lens 62, passed through the dichroic mirror 61, and advanced to the fluorescence filter 65. Only the fluorescence of a desired wavelength band is selectively passed through the fluorescence filter 65. The fluorescence that has passed through the fluorescence filter 65 gets imaged onto the camera 67 by the tube lens (imaging lens) 66, and is captured by the camera 67.

The action (operation) of the pinhole disk 37 will be described. As in the embodiment of FIG. 1, the lights passing through the pinhole disk 37 are coherent laser lights. The phases of the adjacent lights are shifted by a half wave length from each other by the half-wave plate PS. These lights are focused by the objective lens 62.

If the magnification of the objective lens 62 is 100 times, the interval 20 μm between pinholes is projected as 0.2 μm on the focal plane FP. Here, the radius of the Airy disk of the projected focal point is represented by $0.61\lambda/NA$. Accordingly, the radius of the Airy disk is about 0.2 μm. Therefore, the interval between the focal points and the distance from the center of the focal point to the first dark point become almost equal.

Therefore, each light becomes as illustrated in FIG. 5 as in the embodiment of FIG. 1. In general, each focal point is focused as indicated by the dotted line A. Since the phases of the focal points adjacent to each other are mutually shifted by a half wavelength, the adjacent lights interfere destructively at the superposed portion. This results in the point spread as indicated by the solid line B in FIG. 5. The width of this point spread is thinner than the normal diffraction limit.

A state viewed from the front of the focal plane FP is as illustrated in FIG. 6 as in the embodiment of FIG. 1. By the interference of the lights with the same phase indicated by the solid line and the lights with the phases mutually shifted by a half wavelength indicated by the dotted line of the adjacent lights, a trough is formed by the destructive interference as indicated by the straight line. As a result, only the area C indicated by hatching in FIG. 6 is selectively illuminated. This area is smaller than the area of the focal spot indicated by the thick solid line circle D, which is squeezed by a normal illumination light.

The fluorescence from this limited area is captured by the camera 67. FIG. 7 further illustrates a distribution of the fluorescence on the camera 67 when an extremely small observation target is placed on the top of the focal point of each illumination light and the light is fluorescent.

As illustrated in FIG. 7, the distribution of the fluorescence is made gentler than a steep illumination pattern by the optical system of the imaging system. The information from the limited area gets imaged on the camera 67.

The tube lens 66 and the projection lens 60 are selected to have the same focal distance. Accordingly, the interval between the focal points on the camera 67 is the same 20 μm as the pinhole interval. The pixel size of the camera 67 is, for example, 6 μm, which is sufficiently smaller than 20 μm. Thus, the camera 67 can capture the fine information.

The operation of the controller 68 will be described. The control unit 74 controls the laser light source 34 via the light source control unit 73.

An image from the camera is input to a high-frequency component extraction circuit 70. A high-frequency component, i.e., a super-resolution component, is extracted from the image and a super-resolution image is generated. This image is temporarily stored in a temporary storage unit 71. The image to be captured here is the limited image information from the narrow spot as illustrated in FIG. 5. Thus, the information of the trough portion in FIG. 6 is missing. FIG. 8 is a schematic diagram illustrating such an information missing state. In FIG. 8, the adjacent focal points are indicated by small solid line circles.

The control unit 74 performs the following processing so as to complement the part where the information is lost by the interference as illustrated in FIG. 8. In other words, the control unit 74 captures images while moving the pinhole disk 37 by a small distance as A→B→C→D via the fine movement stage controller 75, and stores the captured images in the temporary storage unit 71. Based on the images, the control unit 74 constructs an image by combining the information (images) using the image generation unit 72, and displays the image on the display 69.

In the microscope apparatus 57, it is possible to obtain an illumination light smaller than the diffraction limit by obtaining a plurality of focal points of illumination lights and allowing the focal points to interfere with each other. Thus, florescent images can be observed at a resolution higher than before.

Further, in the microscope apparatus 57, the microlens ML is provided on the entire surface of the pinhole PH. Thus, the divergence angle of the light diffracted by the pinhole PH can be adjusted, and therefore the utilization efficiency of light can be increased.

Further, in the microscope apparatus 57, the area of the focal point on the focal plane FP and the camera 67 can be slightly moved with the movement of the pinhole disk (pinhole array) 37 by a small distance. Thus, the specimen 63 can be thoroughly observed Further, by extracting the high-frequency component from the captured image, the image information in the vicinity of the focal point can be extracted. Thus, a slice image in the vicinity of the focal point can be observed as in a confocal microscope.

Further, the interval between the focal points is set substantially equal to the distance from the focal point to the first dark point. Thus, the area to be illuminated can be effectively reduced.

Figure 11:
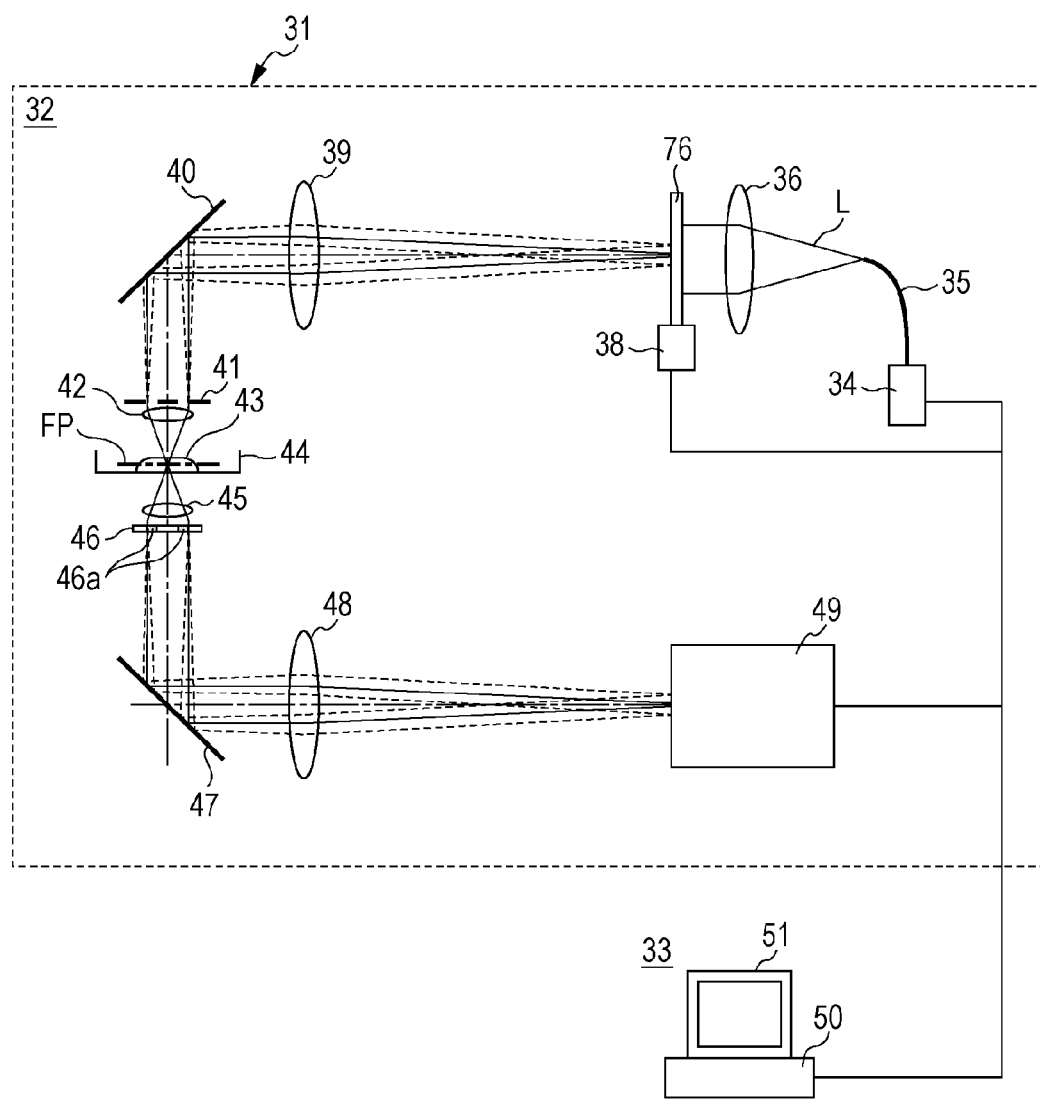
FIG. 11 is an explanatory diagram illustrating a configuration of still another embodiment of the disclosure.
Figure 12:
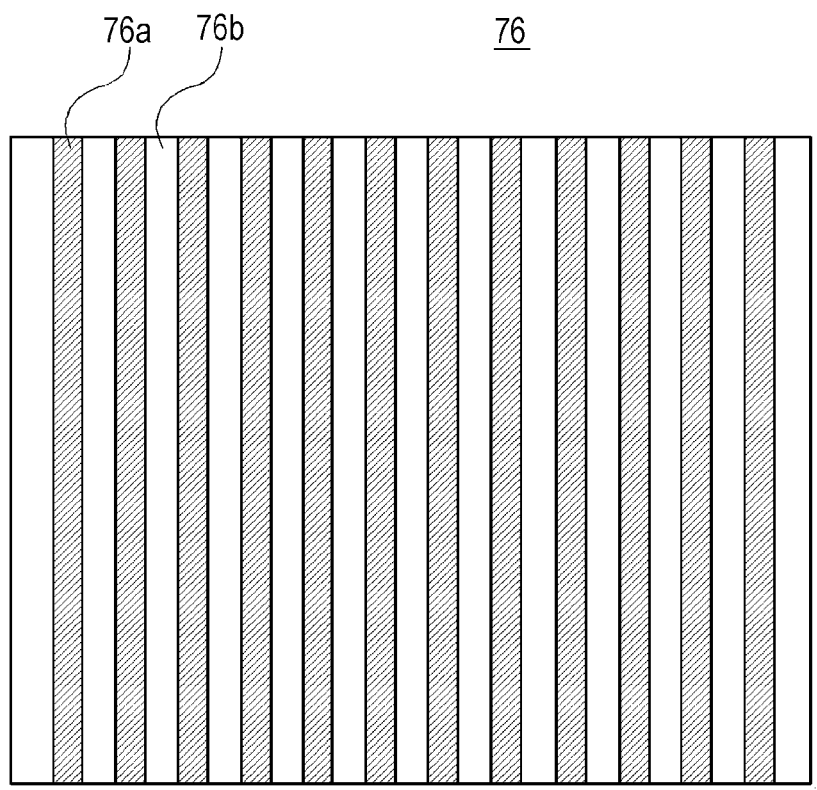
FIG. 12 is an explanatory diagram of a phase diffraction grating used in the embodiment illustrated in FIG. 11.

FIG. 11 is an explanatory diagram illustrating a configuration of another embodiment of the disclosure. Parts corresponding to those illustrated in FIG. 1 are denoted by the same reference numerals. As illustrated in FIG. 11, the microscope apparatus 31 may have a phase diffraction grating 76 as illustrated in FIG. 12, instead of the pinhole disk 37 illustrated in FIG. 1. The phase diffraction grating 76 is connected to the fine movement stage 38, similarly to the pinhole disk 37.

In FIG. 12, the phase diffraction grating 76 is divided by 9 μm pitch. The grating 76a indicated by hatching is constructed to delay the phase of light passing through the grating 76a by π/2 behind the phase of light passing through the grating 76b illustrated in white.

As the condenser lens 42 and the objective lens 45, for example, lenses with a magnification of 40 and an NA of 0.95 are selected. These lenses are disposed at positions to be conjugate with each other.

The phase plate 46 is disposed at the pupil position of the objective lens 45. The total reflective mirror 47 is disposed ahead of the phase plate 46. The tube lens 48 for imaging light on the camera 49 is disposed ahead of the total reflective mirror. The camera 49 is disposed at the imaging position of the tube lens 48. The tube lens 48 and projection lens 39 are selected to have the same focal distance. As the camera 49, one with a pixel size of 2 μm is used, for example.

Next, the operation of the microscope apparatus 31 will be described. The output light from the laser light source 34 is incident on the collimator lens 36 through the optical fiber 35, and is converted into a parallel light. The parallel light is incident on the phase diffraction grating 76. The parallel light is diffracted into a 0-order light and a +1-order diffracted light by the action of the phase diffraction grating 76. FIG. 11 illustrates only the +1-order diffracted light.

Figure 13:
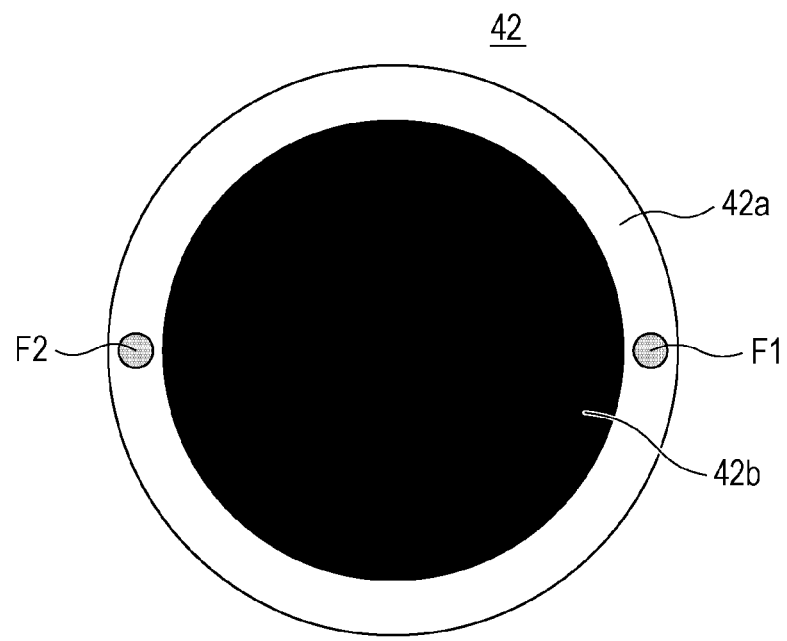
FIG. 13 is an explanatory diagram of a pupil of a condenser lens provided at the same position as a slit ring.

The +1-order diffracted light is reflected by the reflective mirror 40 by the action of the projection lens 39, and then focused on the pupil position of the condenser lens 42 as illustrated in FIG. 13. The slit ring 41 is provided at the pupil position of the condenser lens 42. The outer diameter of the opening of the slit ring 41 is set to almost the same size as the pupil diameter of the condenser lens 42.

The slit ring 41 functions to block the 0-order light that has passed through the phase diffraction grating 76. The +1-order diffracted light is divided into two parallel lights by the condenser lens 42, and forms an interference fringe on the focal plane FP that is adjusted to be positioned inside the specimen 43.

The following describes a case where the specimen 43 is a phase object. The transmitted light passing directly through the specimen 43 is focused on the pupil position of the lens 45. The phase plate 46 is disposed at the pupil position of the objective lens 45. At the position of the phase plate 46 corresponding to the slit rings 41, a wave plate 46a that advances a phase (wavelength) by a quarter wavelength is incorporated. A ND filter for adjusting brightness is also incorporated in a part of the wave plate 46a.

The phase (wavelength) of the light that has passed through the specimen 43 is advanced by a quarter wavelength by the wave plate 46a. The light that has passed through the wave plate 46a is reflected by the reflective mirror 47, converted into two parallel lights by the tube lens 48, and forms again an interference fringe on the camera 49.

The phase of the diffracted light diffracted by the specimen 43 as a phase object is delayed by a quarter wavelength. This diffracted light is incident on the objective lens 45. Most of the diffracted light passes through the portion of the phase plate 46 excluding the wave plate, and forms an image on the camera 49 by the tube lens 48. In other words, the phase plate 46 functions to shift the phase of the transmitted light that has passed though the specimen 43 and the phase of the diffracted light that has been diffracted by the specimen 43 to be deviated from each other by a half wavelength.

The phase of the diffracted light that has been diffracted by the specimen 43 is delayed by a half wavelength behind the phase of the transmitted light that has passed through the specimen 43. These lights weaken each other by interference. Accordingly, a dark portion generates, a contrast generates, and therefore an image is formed.

FIG. 13 is an explanatory diagram of the pupil of the condenser lens 42 provided at the same position as the slit ring 41. A ring-shaped +1-order diffracted light irradiation section 42a is formed in the vicinity of the circumference of the pupil. A portion excluding the ring-shaped illumination section 42a of the condenser lens 42 is provided as a light shielding section 42b.

Figure 14:
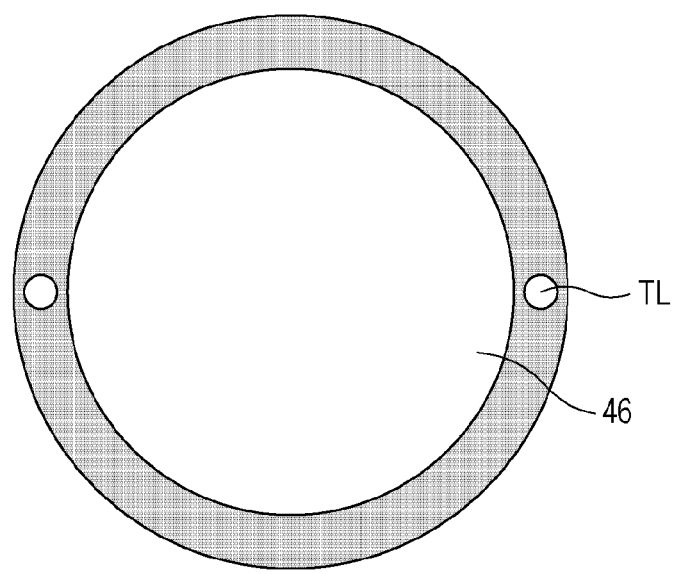
FIG. 14 is an explanatory diagram of an objective lens at a position where a phase plate is disposed.

FIG. 14 is an expiatory diagram of the pupil of the objective lens 45 at the position where the phase plate 46 is disposed. The phase plate 46 is disposed in the vicinity of the circumference so as to be overlapped with each other in a ring shape. A transmitted light TL is emitted in the vicinity of the circumference.

Figure 15:
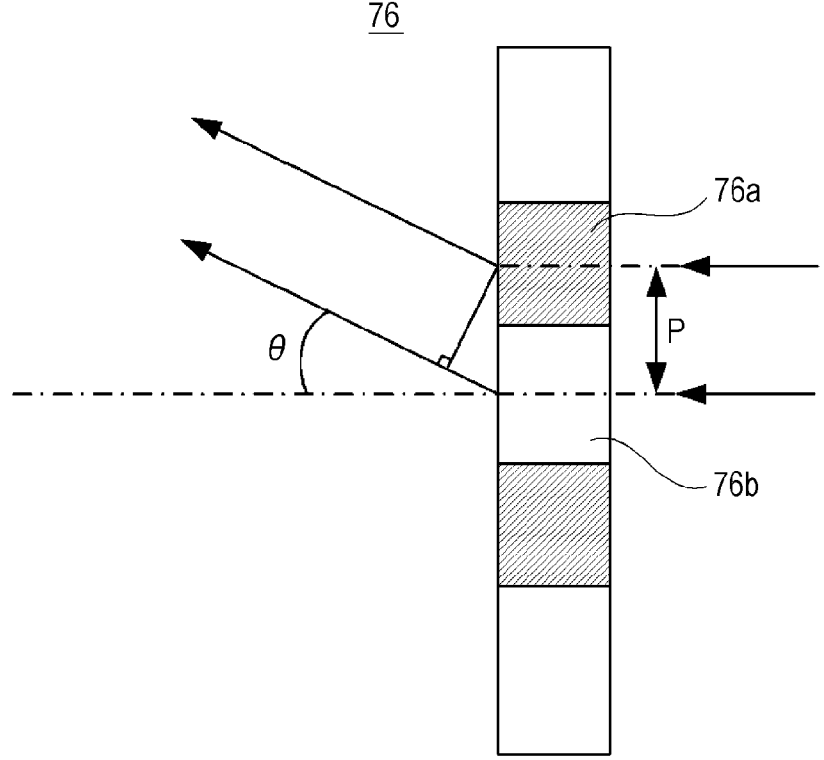
FIG. 15 is an explanatory diagram of a phase diffraction grating.

FIG. 15 is a diagram for describing the operation of the phase diffraction grating 76. The lights passing through the phase diffraction grating 76 are coherent laser lights. The phase diffraction grating 76 shifts the phase of the light passing through the grating 76a to be delayed by a half wavelength (π/2) behind the phase of the light transmitted through the adjacent grating 76b. Thus, a first-order diffraction light is generated in the direction of the following angle.

$$P \cdot \sin \theta = \lambda/2$$

Here, when the pitch P is 9 μm, Sin θ is 0.023.

When a lens with a focal distance f of 180 mm is selected as the projection lens 39, a focal point comes to a portion of the condenser lens 42 having a distance of 4.1 mm from its center. When the condenser lens 42 has f of 4.5 and an NA of 0.95, the radius of the pupil is 4.3 mm. Accordingly, the condenser lens 42 is focused in the vicinity of the outer periphery of the pupil diameter.

As illustrated in FIG. 13, the +1-order diffracted light (first illumination light) and the −1-order diffracted light (second illumination light), which are generated by the phase diffraction grating 76, are focused at focal points F1 and F2 at positions to be symmetrical about a point on the line of the diameter of the ring-shaped irradiation section 42a of the condenser lens 42.

The +1-order diffracted light and the −1-order diffracted light focused on the ring-shaped irradiation section 42a of the condenser lens 42 are, as illustrated in FIG. 14, emitted as the transmitted light TL to the phase plate 46 having a ring shape in the vicinity of the circumference of the objective lens 45.

The +1-order diffracted light and the −1-order diffracted light are converted into two parallel lights by the condenser lens 42, and form an interference fringe on the focal plane (i.e., the specimen 43). In other words, the interference fringe is projected on the specimen 43 by the focal point based on the +1-order diffracted light and the −1-order diffracted light.

These two lights become a light having an inclination equivalent to an NA of 0.9, and the pitch of the interference fringe is $2 \cdot P1 \cdot NA = \lambda$. Here, P1 is 0.225 μm. These two lights form a fringe close to the diffraction limit.

A lens with f of 4.5 and an NA of 0.95 is selected as the objective lens, and a lens with f of 180 mm is selected as the tube lens 48.

The light that has passed through the specimen 43 is focused by the objective lens 45 at its pupil position. At the pupil position, the phase plate 46 is disposed. A wave plate that advances a phase by a quarter wavelength is incorporated at the position of the phase plate 46 corresponding to the opening of the slit ring 41. The light is focused on the wave plate.

These lights are in conjugate relationship with the illumination optical system. The light that has passed through the phase plate 46 is converted into two parallel lights by the tube lens 48, and forms an interference fringe having a pitch of 9 μm on the camera 49. Here, if the pixel size of the camera 49 is 2 μm for example, the pixel size is sufficiently finer than the interference fringe. Thus, the camera 49 can faithfully capture the interference fringe.

When a diffracted light generates on the focal plane, the diffracted light interferes with the light passing therethrough. For example, assume that a structure having a cycle shorter than the pitch P1 and larger than a half of P1 is provided for the focal plane. Since the pitch of the illumination light is P1, diffraction occurs at a pitch P1, and a Moire pattern is generated on the surface of the camera 49. Since the pattern of the illumination light is obvious, the periodic structure of the focal plane can be obtained by inverse calculation using the moire. The Moire pattern is generated in a periodic structure of approximately a half of a projected pitch. Thus, by inverse calculation, it is possible to obtain information having a resolution approximately twice the before.

In this state, the information of the bright portion of the interference fringe on the focal plane can be obtained. The information of all portions on the focal plane can be obtained through calculation by capturing images while moving the phase diffraction grating 76 using the stage 38 so that the pitch P1 of the interference fringe is moved by ⅓ of the pitch.

Incidentally, only one direction having a fringe becomes a high resolution by the above-described method. High resolution information of a plurality of directional components can be obtained by capturing images as described above while rotating the phase diffraction grating 76 by 120 degrees using the stage 38, for example. A high resolution image can be formed by finally combining the information.

When the phase diffraction grating 76 is rotated, the illumination light is focused on the opening of the slit ring 41, and is further focused on the wave plate on the phase plate 46. In this case, it is not necessary to rotate the slit ring 41 and the phase plate 46. Thus, the configuration of the entire apparatus can be simplified.

In the above embodiment, an example of using the phase diffraction grating 76 is described. The present invention is not limited thereto, and a spatial phase modulation element may be used instead of the phase diffraction grating 76, for example.

It is possible to reconstruct a high resolution image from the captured images by irradiating the specimen 43 with the illumination light that generates a fringe close to the diffraction limit, projecting the transmitted light that has passed through the specimen 43 again onto the camera 49, and projecting onto the camera 49 the diffracted light obtained by diffraction of the illumination light by the specimen 43 to allow the transmitted light and the diffracted light to interfere with each other.

Even when the specimen 43 is a phase object, the diffracted light and the illumination light cause interference by shifting the wavelength of the light that has passed through the specimen 43 by the quarter-wave plate. Thus, even in this case, an image with a contrast can be obtained.

By disposing the slit ring 41 on the outer peripheral portion of the pupil diameter of the condenser lens 42, the fringe close to the diffraction limit of the condenser lens 42 can be projected.

Since the slit is formed in a ring shape as the slit ring 41, it is not necessary to rotate the illumination light slit even when the phase diffraction grating 76 is rotated.

Further, since the phase plate 46 is arranged in a ring shape, it is not necessary to rotate the phase plate 46 even when the phase diffraction grating 76 is rotated.

Figure 16:
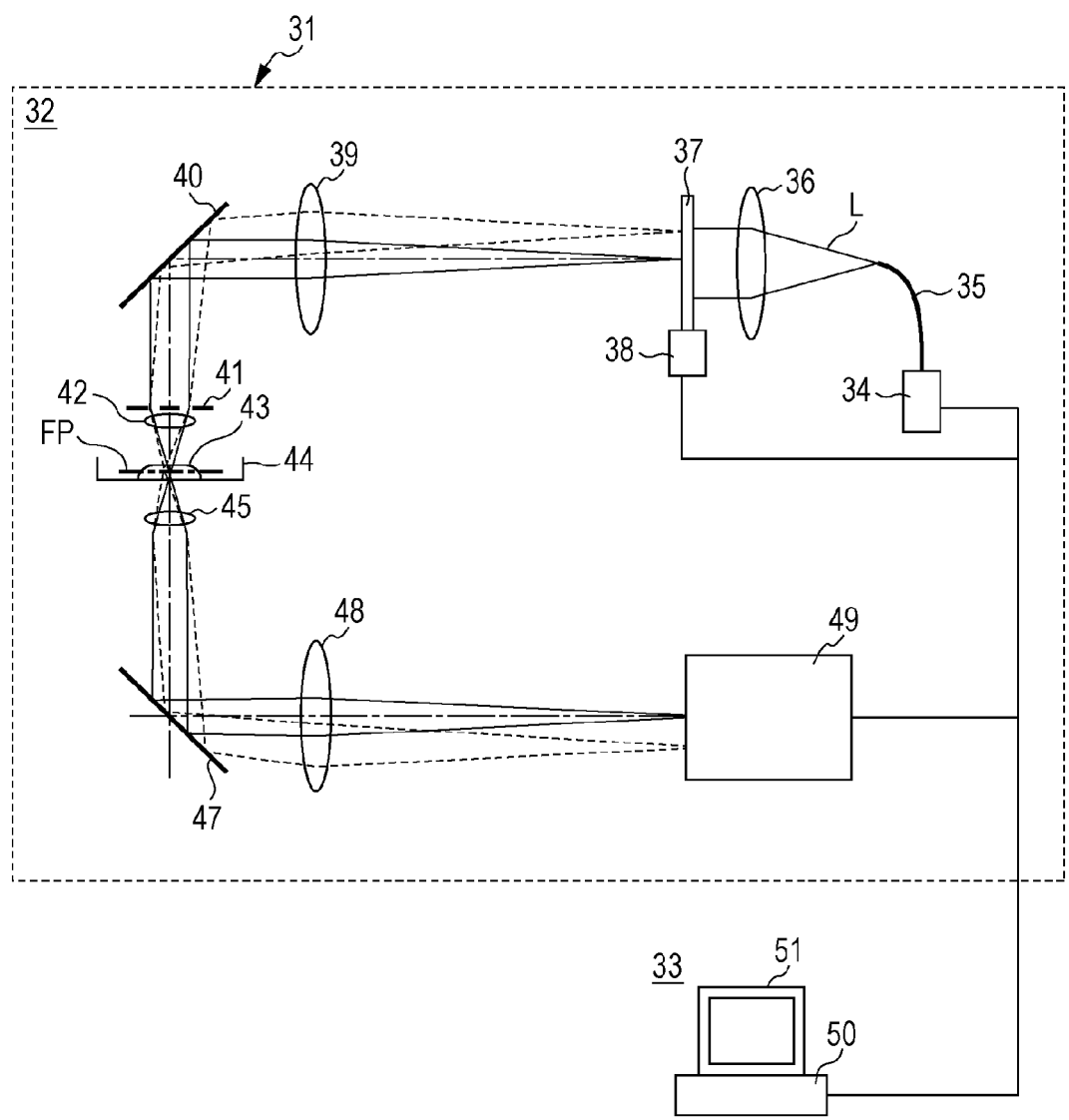
FIG. 16 is an explanatory diagram illustrating a configuration of still another embodiment of the disclosure.

FIG. 16 is an explanatory diagram illustrating a configuration of another embodiment of the disclosure. Parts corresponding to those illustrated in FIG. 1 are denoted by the same reference numerals. As illustrated in FIG. 16, the microscope apparatus 31 may not use the slit ring 41 of FIG. 1. Here, the specimen 43 as an observation object is a light absorber.

The transmitted light directly passing through the specimen 43 is focused on the pupil position of the objective lens 45. When passing through the specimen 43, the light is partially absorbed by the specimen 43. As a wave plate is not provided, the transmitted light is directly reflected by the reflective mirror 47, converted into two parallel lights by the tube lens 48, and forms an interference fringe again on the camera 49.

In this embodiment, the diffracted light generated by the light absorber as an observation object is collected by the objective lens 45, reflected by the reflective mirror 47, and focused on the surface of the camera 49 by the tube lens 48. Differently from the embodiment illustrated in FIG. 1, the light that has passed through the light absorber and the light diffracted by the light absorber are equal in phase. Thus, these lights interfere with each other on the surface of the camera 49, and form an image.

A laser light source that outputs (oscillates) light of a plurality of wavelengths may be used as the laser light source 34. In this case, it is possible to obtain color information by capturing an image for each wavelength and obtaining an image of transmitted light for each wavelength. Even when the specimen 43 is a light absorber, the specimen 43 can be observed at a high resolution.

Figure 17:
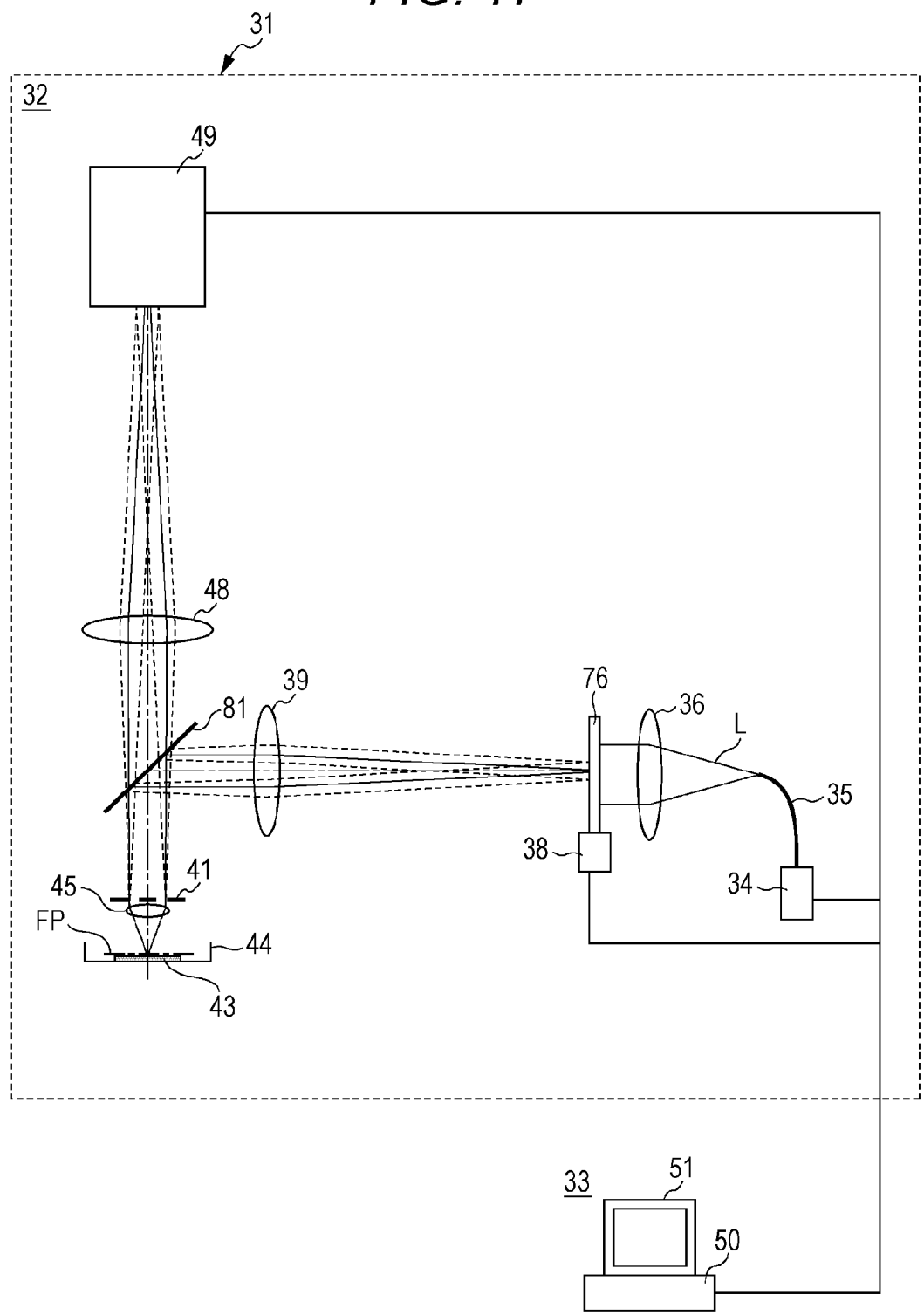
FIG. 17 is an explanatory diagram illustrating a configuration of a further embodiment of the disclosure.

FIG. 17 is an explanatory diagram illustrating a configuration of another embodiment of the disclosure. In this embodiment, the microscope apparatus 31 is a bright field microscope. Parts corresponding to those illustrated in FIG. 1 are denoted by the same reference numerals. The difference between the microscope apparatus 31 of FIG. 1 and the microscope apparatus 31 of FIG. 17 is a microscope optical system.

In FIG. 17, a half mirror 81 is used instead of the reflective mirror 40. The tube lens 48 and camera 49 are arranged behind the half mirror 81.

Figure 18:
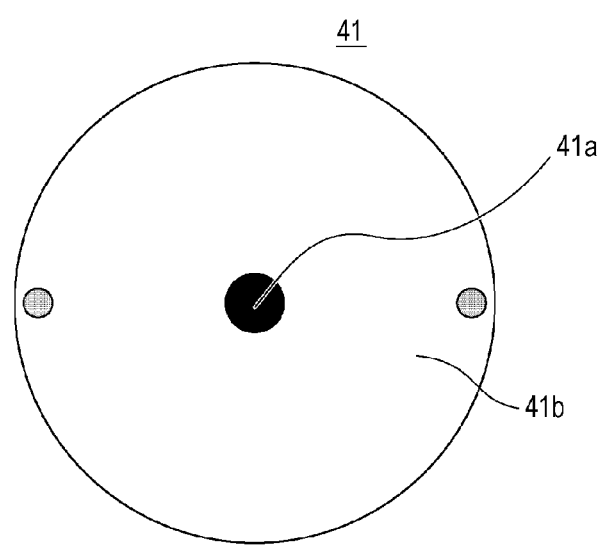
FIG. 18 is an explanatory diagram illustrating another configuration of the slit ring.
Figure 19:
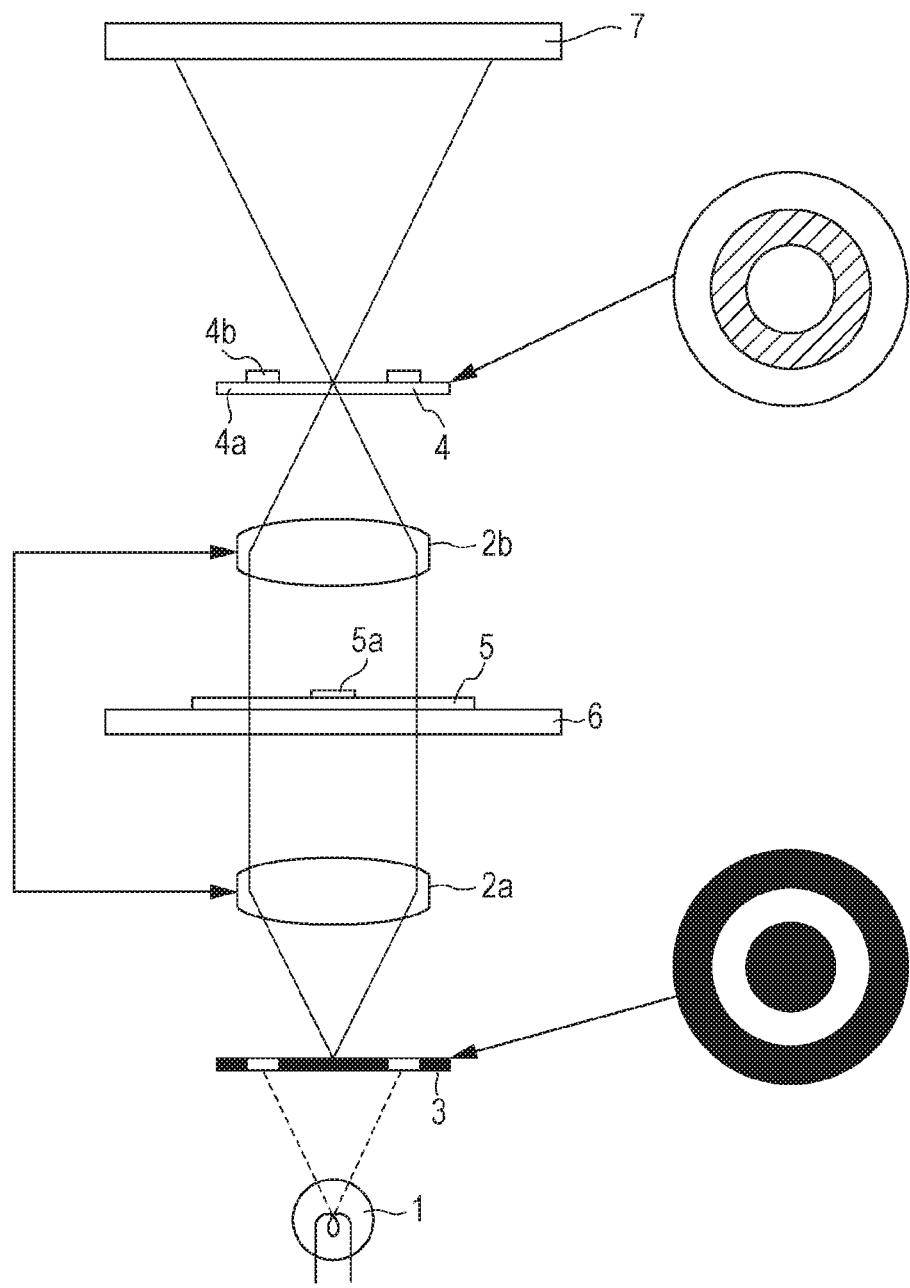
FIG. 19 is an explanatory diagram illustrating a configuration of a common phase contrast microscope.
Figure 20:
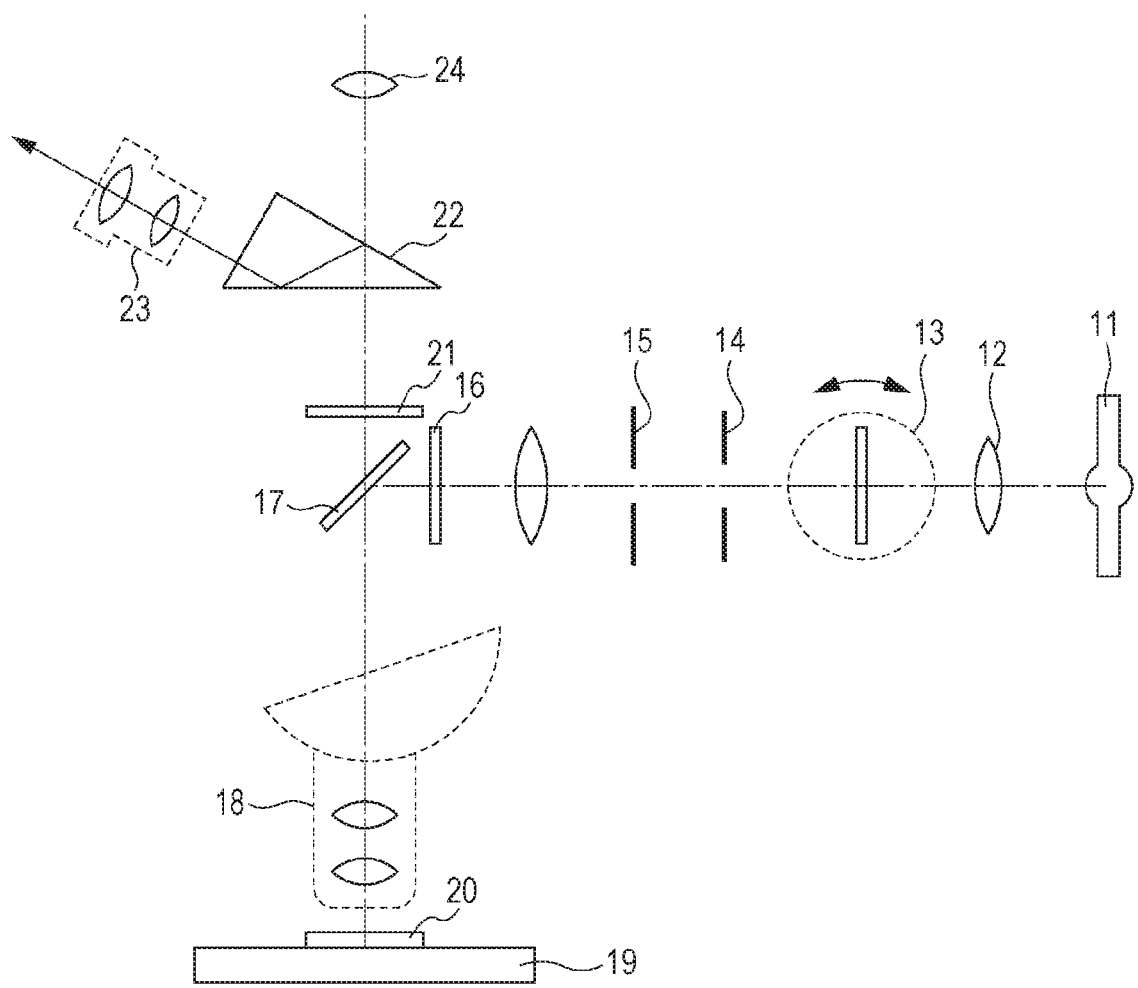
FIG. 20 is an explanatory diagram illustrating another configuration of a common fluorescence microscope.

The slit ring 41 has a structure as illustrated in FIG. 18, for example. As illustrated in FIG. 18, a light shielding portion 41a for shielding a 0-order light is provided in the center. The light shielding portion 41a is formed in the minimum necessary size. The outer periphery of the light shielding portion 41a is formed as an opening 41b. The +1-order diffracted light and the −1-order diffracted light generated by the phase diffraction grating 76 are, as in the microscope apparatus 31 illustrated in FIG. 13, incident on position to be symmetrical about a point on the line of the diameter of the slit ring 41.

In the microscope apparatus 31 of FIG. 17, the objective lens 45 is used instead of the condenser lens 42.

The illumination system operates similarly in the other embodiments illustrated in FIG. 1, FIG. 9, and FIG. 11. In the embodiment of FIG. 17, the specimen 43 to be observed is a highly reflective object having a flat surface (e.g., glass). The following describes a case where the surface condition is observed in detail.

In FIG. 17, the +1-order diffracted light is reflected by the half mirror 81 by the action of the projection lens 39, and then focused on the pupil position of the objective lens 45. The slit ring 41 is provided at the pupil position of the objective lens 45.

As described above, the outer diameter of the opening of the slit ring 41 is almost the same as the pupil diameter of the condenser lens 42. The slit ring 41 functions to shield the 0-order light that has passed through the phase grating. The +1-order diffracted light is divided into two parallel lights by the object lens 45, and forms an interference fringe on the focal plane FP that is adjusted to be positioned on the surface of the specimen 43.

The light that is directly reflected by the specimen 43 is focused again on the pupil position of the objective lens 45. This light is converted into two parallel lights by the tube lens 48 after passing through the half mirror 81, and forms again an interference fringe on the camera 49.

When there is a scatterer on the surface of the specimen 43, the light scattered by the scatterer is collected by the objective lens 45, passed through the half mirror 81, and focused on the camera 49 by the tube lens 48. Here, the light scattered by the specimen 43 and the light reflected by the specimen 43 interfere with each other, and form an image.

In this embodiment, color information may be obtained using a light source that outputs (oscillates) light of multiple wavelengths.

Therefore, even when the specimen 43 is a reflective object, the specimen can be observed at a high resolution.

As described above, according to the embodiments of the present disclosure, it is possible to obtain an illumination light (spot of illumination light) smaller than the diffraction limit by interference of a plurality of focal points with each other. Thus, a microscope apparatus capable of observing in super-resolution exceeding the diffraction limit of light can be provided.

In the microscope apparatus 31, the light that has passed through the slit ring 41 is focused on the focal plane FP by the condenser lens 42. Since the light has passed through the outer periphery of the pupil diameter of the condenser lens 42, the light is narrowed down to a spot close to the diffraction limit.

The light diffracted by the observation object is delayed in phase a quarter wavelength by diffraction. The diffracted light may be focused at the same point as the focal position of the transmitted light on the camera 49 through the tube lens 48, after passing through the portion of the phase plate 46 excluding the wave plate. In this apparatus, the interval between the focal points is approximately equal to the distance to the first dark point of the focal point, i.e., the radius of the Airy disk.

In the microscope apparatus 31, in order to complement a part where the information is lost by interference, the control unit 55 moves the pinhole disk 37 as A→B→C→D via the fine movement stage controller 56, and stores the captured images in the input unit 52. Based on the images, the control unit 55 may construct an image by combining the information by the image generation unit 53, and display the image on the display 51. According to this apparatus, the illumination light has a plurality of focal points, and is smaller than the diffraction limit by interference of the focal points. Thus, the phase difference can be observed at a resolution higher than before.

In the microscope apparatus 31 illustrated in FIG. 11, the +1-order diffracted light is divided into two parallel lights by the condenser lens 42, and may form an interference fringe on the focal plane FP that is located inside the specimen 43. AND filter for adjusting brightness may be incorporated at a part of the wave plate 46a. The light diffracted by the specimen 43 is delayed a half wavelength in phase with respect to the light that has passed through the specimen 43. Thus, an image may be formed by a dark contrast that is generated by destructive interference of these lights. The light passing through the phase diffraction grating 76 is a coherent laser light. The phases of adjacent lights on the fringe formed by the gratings 76a and 76b of the phase diffraction grating 76 may be mutually shifted by a half wavelength. When the condenser lens 42 has f of 4.5 and an NA of 0.95, the pupil radius is 4.4 mm, and the light is focused close to the outer periphery of the pupil diameter.

The information of all locations on the focal plane may be obtained through calculation by capturing images while moving the phase diffraction grating 76 by the stage 38 so to move the interference fringe by ⅓ of the pitch P1. By capturing images at positions where the phase diffraction grating 76 is rotated by 120 degrees by the stage 38, for example, it is possible to obtain the high resolution information of the plurality of directional components.

In the microscope apparatus according to the embodiments of the disclosure, an illumination light smaller than the diffraction limit can be obtained by interference of a number of focal areas. Thus, an object can be observed in super-resolution exceeding the diffraction limit of light.

The microscope apparatus according to the embodiment of the disclosure may be the following first to the eighth microscope apparatus. The first microscope apparatus includes a light source configured to oscillate a coherent illumination light to be emitted to a specimen; a projection optical system configured to irradiate a specimen with the illumination light; and a detector configured to detect a light generated from the specimen by the illumination light emitted to the specimen. The coherent light is projected onto a plane vertical to an optical axis as a number of focal points via the projection optical system, and phases of adjacent focal points of the number of focal points are shifted, so that an area of the number of projected focal points is reduced.

In the second microscope apparatus according to the first microscope apparatus, a plurality of divergent light is generated by passing the coherent light through a pinhole array, and the number of focal points is projected onto the plane vertical to the optical axis by projecting the pinhole array.

In the third microscope apparatus according to the first or second microscope apparatus, the detection optical system is configured to generate a contrast by interference of a light diffracted by the specimen and a light passing through the specimen.

In the fourth microscope apparatus according to the second or third microscope apparatus, pinholes constituting the pinhole array are combined with an optical element having a lens effect.

In the fifth microscope apparatus according to the first to the fourth microscope apparatus, an interval between the focal points is a value between 0.6 times and two times the distance to a first dark point of the focal point.

In the sixth microscope apparatus according to the first to the fifth microscope apparatus, the detection optical system includes a unit for extracting a high-frequency component of the detected image.

The seventh microscope apparatus includes a light source configured to oscillate a coherent illumination light to be emitted to a specimen; a projection optical system configured to irradiate a specimen with the illumination light; and a detector configured to detect a light generated from the specimen by the illumination light emitted to the specimen. The coherent light is emitted to the specimen in at least two directions via the projection optical system so as to be projected as a plurality of interference fringes onto a plane vertical to an optical axis, and a contrast is generated by interference of a light diffracted by the specimen and a light passing through the specimen.

In the eighth microscope apparatus according to the seventh microscope apparatus, the interference fringe is generated by emitting a diffracted light in two directions, the diffracted light being generated by a phase diffraction grating.

According to the first to eighth microscope apparatus, it is possible to obtain illumination light smaller than a diffraction limit by interference of a number of focal areas, thereby enabling observation in super-resolution exceeding the diffraction limit of light.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A microscope apparatus comprising:
   a light source configured to emit a coherent illumination light;
   an optical system configured to irradiate a specimen with the illumination light; and
   a detector configured to form an image based on a light generated from the specimen by the illumination light that irradiates the specimen, wherein
   the optical system includes:
   a pinhole array that includes a plurality of pinholes and generates a plurality of illumination lights by passing the illumination light from the light source through the pinhole array;
   a condenser lens configured to project the plurality of illumination lights having passed through the pinhole array on the specimen as a plurality of focal points; and
   a phase plate positioned to oppose to the condenser lens with the specimen interposed therebetween and configured to shift a phase of transmitted light that has passed through the specimen and a phase of a diffracted light that has been diffracted by the specimen to be deviated from each other by a predetermined wavelength, and
   the detector is configured to generate a contrast by interference of the transmitted light and the diffracted light that have experienced phase shift by the phase plate.

2. The microscope apparatus according to claim 1, wherein
   the optical system is configured to form an area of the illumination light in the specimen, the area being smaller than the focal point, wherein phases of adjacent focal points of the plurality of focal points have different phases, such that the adjacent focal points interfere with each other.

3. The microscope apparatus according to claim 1, wherein
   the pinhole array includes a half-wave plate that is disposed in every other pinhole.

4. The microscope apparatus according to claim 3, further comprising
   a fine movement stage for finely moving the pinhole array.

5. The microscope apparatus according to claim 1, further comprising
   a slit ring that is disposed on an outer periphery of a pupil diameter of the condenser lens.

6. The microscope apparatus according to claim 1, wherein
   the phase plate shifts a phase of a transmitted light that has passed through the specimen and a phase of a diffracted light that has been diffracted by the specimen to be deviated from each other by a half wavelength.

7. The microscope apparatus according to claim 1, wherein
   an interval between the plurality of focal points is 0.6 to 2 times a distance from a center of the focal point to a first dark point.

8. The microscope apparatus according to claim 1, further comprising a high-frequency component extractor configured to extract a high-frequency component of the image formed by the detector.

9. The microscope apparatus according to claim 1, wherein
the pinhole array is configured to generate a first illumination light and a second illumination light having a phase different from that of the first illumination light based on the illumination light from the light source, and projects an interference fringe on the specimen from a focal point of the first illumination light and a focal point of the second illumination light of the plurality of focal points.

10. A microscope apparatus comprising:
a light source configured to emit a coherent illumination light;
an optical system configured to irradiate a specimen with the illumination light; and
a detector configured to form an image based on a light generated from the specimen by the illumination light that irradiates the specimen, wherein
the optical system includes:
a phase diffraction grating for generating the first illumination light, having a +1-order diffracted light, and the second illumination light, having a −1-order diffracted light;
a lens configured to project the first illumination light and the second illumination light on the specimen as a plurality of focal points; and
a phase plate configured to shift a phase of transmitted light that has passed through the specimen and a phase of a diffracted light that has been diffracted by the specimen to be deviated from each other by a predetermined wavelength, and
the detector is configured to generate a contrast by interference of the transmitted light and the diffracted light,
wherein the phase plate shifts a phase of a transmitted light that has passed through the specimen and a phase of a diffracted light that has been diffracted by the specimen to be deviated from each other by a half wavelength.

11. The microscope apparatus according to claim 10, wherein
the optical system is configured to project an interference fringe on the specimen from a focal point of the first illumination light and a focal point of the second illumination light of the plurality of focal points.

* * * * *